United States Patent [19]

Gupta

[11] 4,330,505

[45] May 18, 1982

[54] HYDROPROCESSING REACTOR WITH EXTENDED OPERATING LIFE

[75] Inventor: Ramesh Gupta, Chatham Township, Morris County, N.J.

[73] Assignee: Exxon Research & Engineering Co., Florham Park, N.J.

[21] Appl. No.: 212,755

[22] Filed: Dec. 4, 1980

[51] Int. Cl.³ .............................................. B01J 8/04
[52] U.S. Cl. ................................... 422/217; 422/115; 422/191; 422/195
[58] Field of Search ............... 422/115, 217, 191, 171, 422/193, 195, 220; 261/94–98

[56] References Cited

U.S. PATENT DOCUMENTS

| | | | |
|---|---|---|---|
| 3,235,344 | 2/1966 | Dreyer et al. | 422/191 |
| 3,425,810 | 2/1969 | Scott, Jr. | 422/191 |
| 3,431,084 | 3/1969 | Forbes | 422/217 |
| 3,509,043 | 4/1970 | McMaster et al. | 422/191 |
| 3,598,539 | 10/1971 | Pizzato | 261/97 |
| 3,607,000 | 9/1971 | Beal | 208/216 |
| 3,702,238 | 11/1972 | Armistead et al. | 422/195 |
| 3,796,655 | 3/1974 | Armistead et al. | 422/191 |
| 3,824,081 | 7/1974 | Smith et al. | 422/217 |
| 3,888,633 | 6/1975 | Grosboll et al. | 422/217 |
| 3,996,015 | 12/1976 | Hutchings | 422/217 |
| 4,239,614 | 12/1980 | Hutchings | 422/217 |

*Primary Examiner*—Gregory N. Clements
*Attorney, Agent, or Firm*—Robert S. Salzman; Donald F. Wohlers

[57] ABSTRACT

The invention is for a fixed bed reactor with two phase gas and liquid flow. The reactor has at least one auxiliary bed of solid particles disposed above the main bed of solid particles. The auxiliary bed has separate liquid and gas bypasses comprised of hollow tubing extending through the auxiliary bed. Liquid receptacles provide a liquid seal above the liquid bypasses, thereby preventing gas from bypassing along with the liquid. The liquid spilled from the flow receptacles seeks its lowest level and flows through the auxiliary bed, thereby leaving only the gas to flow through the gas bypasses. This separate feed arrangement allows for a low pressure drop bypassing of the auxiliary bed, when the auxiliary bed becomes fouled and clogged. The invention is also applicable to other apparatuses which use a flow arrangement similar to fixed bed reactors, but which do not necessarily utilize a chemical reaction. One example of such apparatus is a packed absorption tower having co-current downflow of gas and liquid.

7 Claims, 7 Drawing Figures

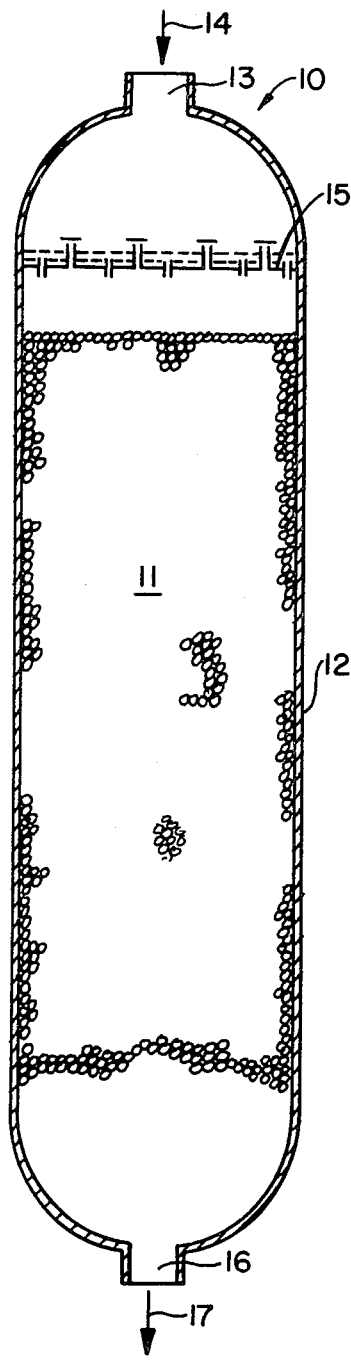
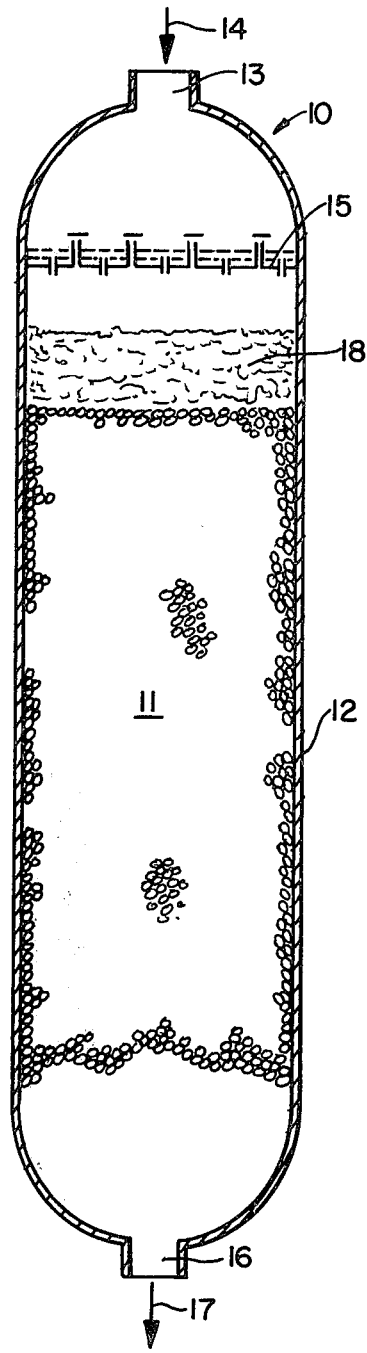
FIG.1
PRIOR ART
FIG.1a
PRIOR ART

HYDROPROCESSING REACTOR WITH EXTENDED OPERATING LIFE

BACKGROUND OF THE INVENTION

1. Field of the Invention

This invention pertains to a fixed bed reactor or absorption tower having separate liquid and gas bypasses, and more particularly to such apparatuses having a low pressure drop during the bypassing of liquid and gas across the fixed bed.

In the normal operation of fixed bed hydroprocessing oil refining reactors, the top of the catalyst bed often becomes fouled or plugged by the deposition of organometallic compounds, polymeric and carbonaceous materials and particulates. The plugging of the catalyst bed is undesirable, since the resultant increase in pressure drop necessitates costly shut-downs and requires time-consuming repairs and maintenance.

In an effort to overcome this problem many schemes have been devised, wherein each reactor is provided with more than one catalyst bed, and a plugged bed is bypassed to extend the operating life of the reactor.

One such bypass scheme is shown in U.S. Pat. No. 3,509,043, issued: Apr. 28, 1970. In this reactor, catalyst bed bypass tubes are used which contain rupture discs. These rupture discs are designed to burst open when the initial catalyst bed becomes fouled, and when a predetermined pressure drop is reached within the reactor. Under normal circumstances this bypass design will provide a workable means for extending the operability of the reactor. However, such a system is particularly sensitive to upsets in the feed flow rate of the reaction materials. These upsets can often cause a premature bursting of the rupture discs.

Another U.S. patent illustrating the use of rupture discs is illustrated in U.S. Pat. No. 3,796,655 issued: Mar. 12, 1974.

In this system, the bypassed material is directed upwardly in order to provide a dislodging backflow, and thus, unfoul the crusted or plugged catalyst bed.

The bypassing schemes of these and other inventions achieve bypassing of the fouled catalyst bed with low pressure drop. High pressure drop bypassing is undesirable since the higher pressure drop necessitates the use of larger and more expensive pumps and compressors in order to maintain the flow rate of the materials through the reactors. The low pressure drop for bypassing is achieved by employing a moving or a destructible component such as a rupture disc. These moving or destructible components are not reliable and may fail to operate or may operate prematurely.

The subject invention provides an improved bypass apparatus, wherein a low pressure drop bypass is achieved without the use of a moving or a destructible component, and further wherein the on-time of the reactor is extended several fold.

BRIEF SUMMARY OF THE INVENTION

This invention pertains to a reactor wherein a two phase gas and liquid mixture reacts in a fixed bed of solid particles. The reactor comprises a reaction vessel into which both liquid and gas are introduced. The reactor has a main bed disposed therein, and at least one auxiliary bed disposed above the main bed. The auxiliary bed has separate liquid and gas bypasses comprised of hollow tubing extending through the auxiliary bed. Liquid flow receptacles provide a liquid seal above the liquid bypasses, thereby preventing gas bypassing through the liquid bypasses. Any liquid that spills from the liquid flow receptacles seeks its lowest level and flows through the auxiliary bed. Thus, only gas is free to flow through the gas bypasses. This individualized liquid and gas bypass arrangement provides a low pressure drop bypass for both said liquid and gas to the main bed, when the auxiliary bed becomes fouled.

The reactor will additionally contain a flow distributor above each auxiliary bed. This distributor will evenly distribute the liquid to the aforementioned liquid flow receptacles disposed above the liquid bypasses.

The reactor will also contain a flow distributor above the main bed to evenly spread the reactants through the entire bed.

A typical reactor of the invention can be a hydroprocessing reactor wherein different petroleum fractions are treated with hydrogen gas. The bed of solid particles in the hydroprocessing reactor may be a catalyst containing a metal or a mixture of metals selected from the group of cobalt, molybdenum and nickel disposed on an alumina support. The reaction may remove, for example, impurities such as sulfur via a hydrodesulfurization reaction. Other important reactions taking place in a hydroprocessing reactor may include hydrogenation, hydrodenitrogenation, hydrotreating, hydrofinishing and hydrocracking. The invention is also applicable to absorption towers.

It is an object of this invention to provide an improved reactor;

It is another object of the invention to provide a liquid and gas, fixed bed, reactor having an appreciably extended operating life;

It is a further object of this invention to provide a fixed bed reactor which effects a material bypass from a clogged or fouled bed to another bed with a low pressure drop.

These and other objects of this invention will be better understood and will become more apparent with reference to the following detailed description considered in conjunction with the accompanying drawings described below.

BRIEF DESCRIPTION OF THE DRAWINGS

FIG. 1 is a schematic view of a typical hydroprocessing reactor having a single fixed bed without the bypassing apparatus of this invention;

FIG. 1a is a schematic view of the reactor of FIG. 1, depicting the fouling of the bed;

DETAILED DESCRIPTION OF THE INVENTION

Figure 2:
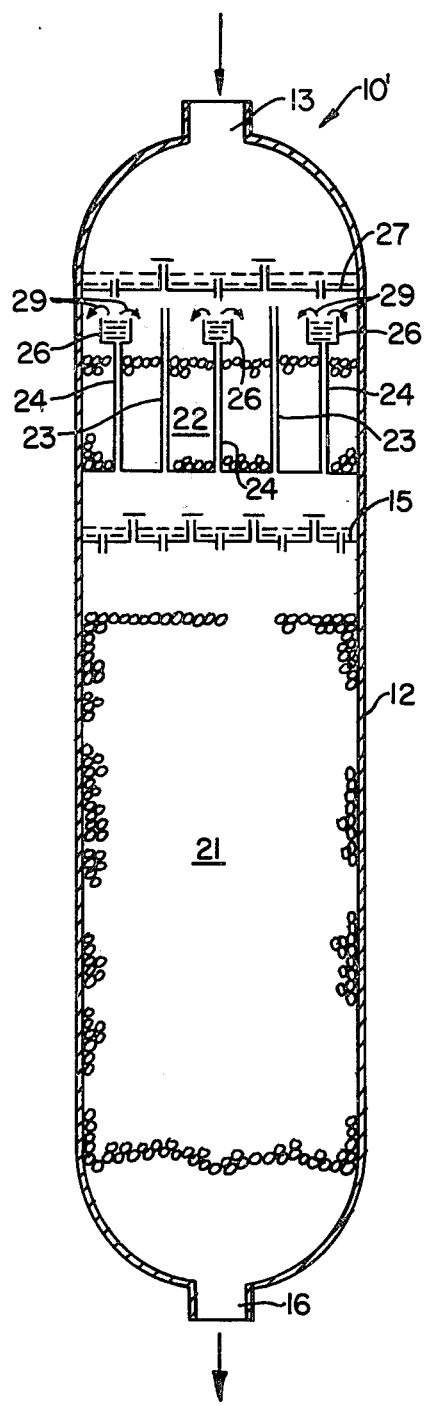
FIG. 2 illustrates the reactor and bypassing apparatus of the invention in schematic view.

Generally speaking, fixed bed hydroprocessing reactors of the type shown schematically in FIG. 1 are often limited in their operation by a build-up in the pressure drop in the catalyst bed 11, as the bed becomes fouled or plugged by impurities and particulates contained in the feed stock, as shown in FIG. 1a.

The reactor 10 comprises a vessel or reaction chamber 12. The feed stock, generally a petroleum fraction is fed into the mouth 13 of the vessel 12 along with a treating gas, such as hydrogen, as shown by arrow 14. A flow distributor 15 disposed above the catalytic bed 11 distributes the liquid and gas so that the catalyst bed 11 is evenly saturated. The reaction products leave the vessel 12 through exit port 16, as shown by arrow 17.

FIG. 1a shows the reactor of FIG. 1 with a plugged catalyst bed 11, as illustrated by the crusted top portion 18 of bed 11. The plugging of the reactor 10 is accompanied by a rapid build-up in pressure drop, as aforementioned.

Figure 2A:
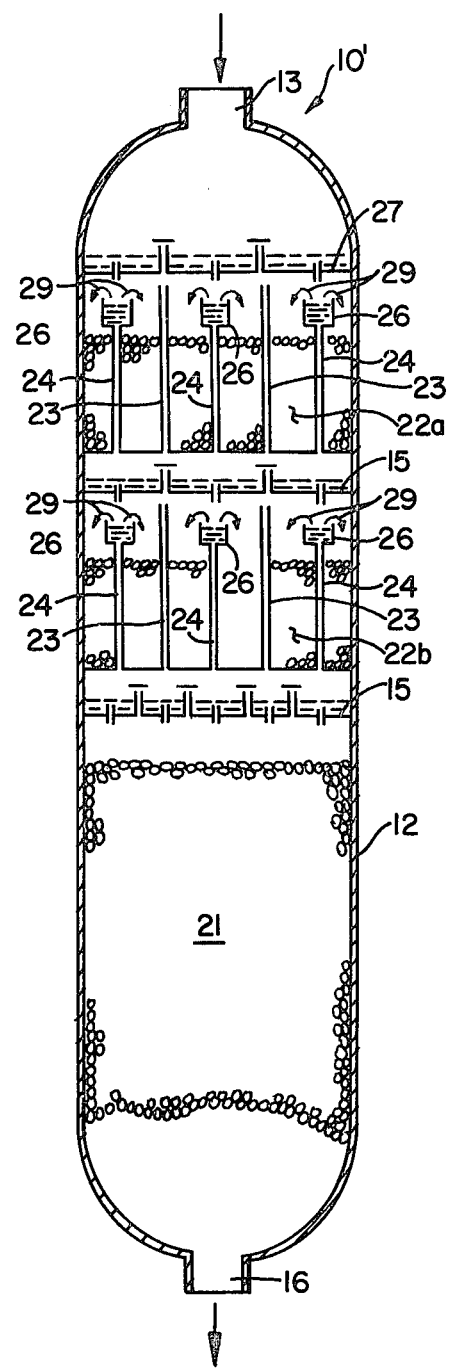
FIG. 2a depicts in schematic view an alternate embodiment of the invention shown in FIG. 2.

The inventive bypass apparatus of the invention is illustrated in FIGS. 2 and 2a. Like components have been given the same designation for the sake of brevity. The reactor 10' is comprised of a reaction vessel 12 having an inlet 13 and an outlet 16, as mentioned before. The invention has a main catalyst bed 21 and an auxiliary catalyst bed 22 disposed above the bed 21 as shown.

The auxiliary catalyst bed 22 in FIG. 2 comprises generally different lengths of hollow tubing 23 and 24, respectively extending therethrough. The tubes 24 have flow receptacles 26 at the top.

A flow distributor 27 is disposed above the auxiliary bed 22 to evenly distribute the liquid to the liquid flow receptacles 26 as shown in FIG. 2.

The distributor 27 can be chosen from many types of distributors that are used in fixed bed reactors with two phase gas and liquid flow. One such distributor which is particularly suitable is described in U.S. Pat. No. 3,524,731 issued Aug. 18, 1970.

A distributor 15 is also disposed above the main bed 21. The purpose of distributor 15 is to evenly saturate the bed.

When the auxiliary bed 22 is not fouled or clogged, the auxiliary bed 22 offers a low resistance to flow in comparison to the bypass tubing 23 and 24. Under the condition of no fouling, only a very small fraction of the liquid passes through the tubes 24. The majority of the liquid spills from the flow receptacles 26 as shown by spill-over arrows 29, and passes through the catalyst bed 22. Similarly, the majority of gas passes through the unfouled bed 22, because the gas bypass tubes 23 offer higher resistance to flow in comparison to the unfouled bed 22. No gas passes through the liquid bypass tubes 24, because the liquid is spilling from the flow receptacles 26, and the liquid inside these flow receptacles provides a liquid seal which prevents the bypassing of gas through the tubes 24. The liquid spilling from the flow receptacles 26 seeks its lowest level and flows through the auxiliary bed 22. Therefore, only gas is free to flow through the gas bypass tubes 23.

As the catalyst bed 22 fouls, the pressure drop across the bed 22 increases. The increased pressure drop forces the liquid through the bypass tubes 24, and the gas through the bypass tubes 23. Thus, the liquid and gas will now enter the main bed 21 through separate respective tubes 24 and 23.

The result of this inventive arrangement is that the reactor's operating life is extended because the reactor vessel 10' continues to operate despite the fouling of the upper catalyst bed 22.

An important feature of the invention is the low pressure drop accompanying the separate flow of liquid and gas through respective tubes 24 and 23. The pressure drop for bypassing the fouled catalyst bed 22 would otherwise be high, if the bypass tubes 24 and 23 had a mixture of gas and liquid flowing through them. Because of this feature, the operating life of the reactor is extended many fold.

As an illustration, assume that the height of the auxiliary bed 22 is three feet. Under the typical gas and liquid flow rates used in commercial hydroprocessing reactors, the pressure drop across an unfouled catalyst bed of three feet height is about 1 psi. The tubes 24 and 23 are sized so that if all liquid and gas flow through respective tubes 24 and 23, the tubing pressure drop will be much higher than the pressure drop of the unfouled bed 22.

As an illustration, and for the sake of discussion, assume that if all the liquid flows through the tubes 24, the pressure drop across the tubes 24 is 20 psi, and if all the gas flows through the tubes 23, the pressure drop across the tubes 23 is 20 psi (20 times the pressure drop of the unfouled catalyst bed 22). When the catalyst bed 22 is not fouled, the majority of gas and liquid will, therefore, flow through the catalyst bed 22. Only a very small fraction of the liquid will pass through the tubes 24. No gas will flow through the tubes 24 because of the liquid seal in the flow receptacles 26. Only a small fraction of the gas will pass through the tubes 23.

As the bed 22 begins to foul, increasing fractions of gas and liquid will be diverted to the respective tubes 23 and 24. A completely plugged bed 22 will be bypassed with a pressure drop of 20 psi. If the bed 22 was not bypassed, the pressure drop would build up rapidly and force a unit shutdown.

FIG. 2a illustrates another embodiment of the invention depicted in FIG. 2. In this embodiment, the single auxiliary catalyst bed 22 of FIG. 2 is replaced by at least two auxiliary catalyst beds herein designated 22a and 22b. Each of these beds operates in the same manner as described above, and each auxiliary bed will increase the operating life of the reactor in its own right. In this fashion, the operating life of the reactor 10' can be extended in multiples of the several fold increases common to only one auxiliary bed and bypass arrangement, as shown in FIG. 2.

Figure 3:
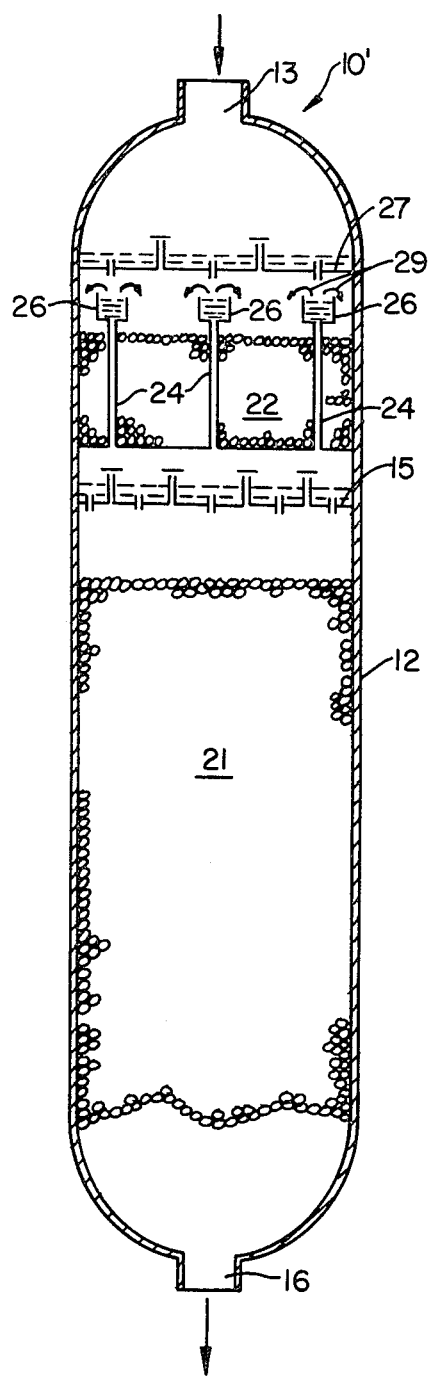
FIGS. 3 and 3a illustrate in schematic view still other embodiments of the invention, FIG. 3a being a further modification of an alternate embodiment depicted in FIG. 3.

FIG. 3 illustrates another embodiment of the invention. In this embodiment, the auxiliary catalyst bed 22 has only the liquid bypass tubes 24. The gas bypass tubes 23 may not be necessary under some conditions. An example will be a situation when the fouled catalyst bed 22 retains enough permeability for the gas to flow through it. Such a situation may exist in reactors operating with a very low gas to liquid ratio. After the bed 22 is fouled, the liquid bypasses through the tubes 24. The gas will pass through the fouled bed itself.

Figure 3A:
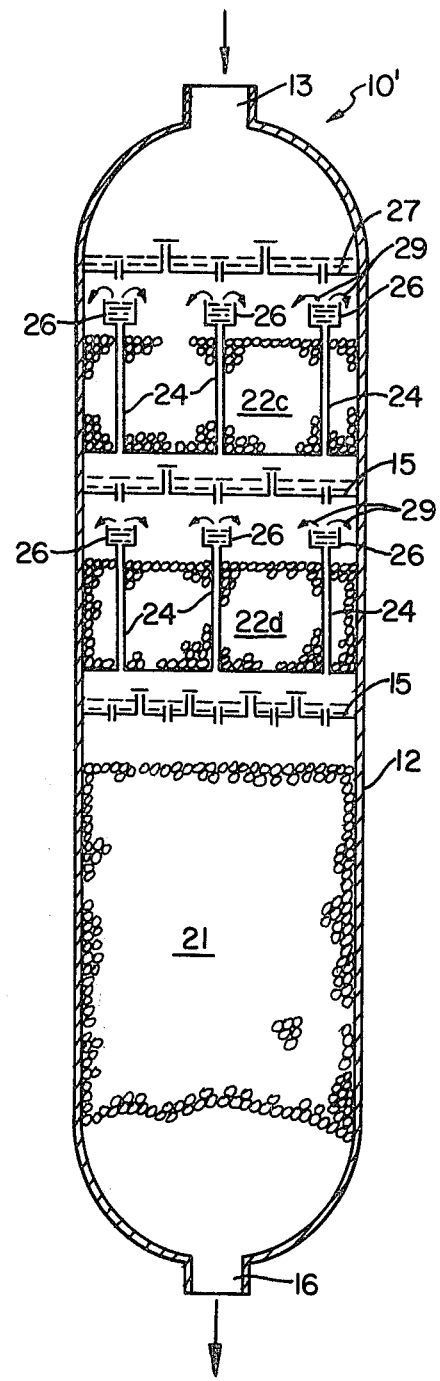

FIG. 3a illustrates a modification of the alternate embodiment of the invention as depicted in FIG. 3. In this modified embodiment, the single auxiliary catalyst bed 22 of FIG. 3 is replaced by at least two auxiliary catalyst beds 22c and 22d, respectively, each of which have only liquid bypass tubing 24, as shown. The operating life of the reactor can be extended in multiples of the several fold increases common to only one auxiliary bed as aforementioned.

Although the invention has been described in relation to a hydroprocessing reactor, the invention is not necessarily limited to such a reactor. The invention includes other reactors in which other liquid and gas mixtures react in fixed beds of solids. The invention also includes apparatus which uses similar flow arrangements. An example where a similar flow arrangement is used is a packed absorption tower with cocurrent downflow of gas and liquid. In this example, the fixed or packed bed of solids only facilitates contacting between the gas and the liquid and does not have a catalytic role.

EXAMPLES

Fouled catalyst bypassing for improving reactor run lengths has been demonstrated in an accelerated or simulated fouling test in the laboratory. Pressure drop build up in a six inch diameter column packed with 1/16 inch catalyst extrudates of cobalt and molybdenum on an alumina support, was measured using water and nitrogen feed. Catalyst fouling was produced by spiking the liquid feed with polymer particles. The polymer particles had a density that was very close to that of water and, therefore, the polymer particles had no significant settling tendency.

Figure 4:
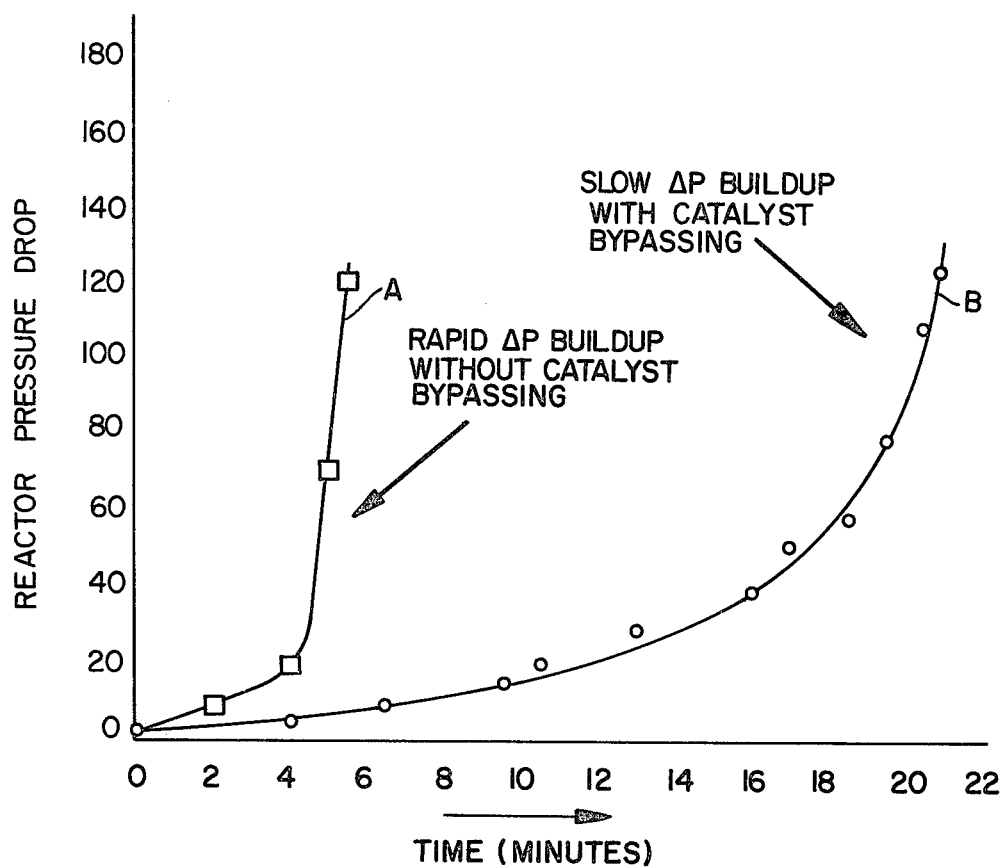
FIG. 4 shows a graphical comparison of the extended operation time of the reactor and bypassing apparatus of the invention illustrated in FIG. 3 as compared with the prior art reactor of FIG. 1.

FIG. 4 shows the advantageous effect of catalyst bypassing on reactor run length. Without catalyst bypassing, the rapid pressure drop build up necessitated that the reactor be shut-down in 5.5 minutes, as shown by curve A. This reactor run length of 5.5 minutes in the accelerated fouling test corresponds to a run length of several weeks to several months in a commercial reactor. When one auxiliary catalyst bed as shown in FIG. 3 was bypassed as per the invention, the reactor run length increased by a factor of about four, from 5.5 minutes (curve A) to 21.0 minutes (curve B).

The above drawings being of an exemplary and schematic nature are only meant to give an understanding of the invention.

Many modifications will naturally occur to the skilled practitioner of this art.

For example, horizontal splash plates or baffles can be provided beneath the liquid and gas bypass tubes. These splash plates would distribute the bypassed material over a larger area of the main bed 21. These splash plates or baffles may thus substitute for the flow distributor 15.

Having thus described this invention, what is meant to be protected by Letters Patent is presented by the following claims.

What is claimed is:

1. A reactor for reacting a two phase, gas and liquid mixture in a fixed bed of solids, comprising:
    a vessel;
    means to introduce both liquid and gas into said vessel;
    means to remove both liquid and gas from said vessel;
    at least one auxiliary bed disposed above said main bed, at least one gas bypass tube for passing gas through said auxiliary bed when said bed becomes fouled and at least one liquid bypass, said liquid bypass comprising a liquid receptacle disposed on top of a hollow unobstructed open tube extending through said auxiliary bed and located directly below said means to introduce liquid into said vessel, said liquid receptacle receiving liquid introduced into said vessel and allowing said liquid to spill over to said auxiliary bed when said auxiliary bed is not fouled, said unobstructed open tube having a flow resistance sufficient to act as a liquid seal against the passage of gas through said liquid bypass tube when said auxiliary bed is not fouled and to provide a low pressure drop bypass for said liquid flowing to said main bed when said auxiliary bed becomes fouled.

2. The reactor of claim 1, wherein there are at least two auxiliary beds disposed in tiers above said main bed, each having at least one liquid bypass.

3. The reactor of claim 2, further comprising a flow distributor above each bed.

4. The reactor of claim 1, further comprising a flow distributor above each bed.

5. The reactor of claim 1, wherein said beds comprise at least one catalyst.

6. The reactor of claim 5, wherein said catalyst consists of metals alone or in mixture, selected from the group: cobalt, molybdenum and nickel, disposed on an alumina support.

7. The reactor of claim 1, wherein said means for passing gas through said auxiliary bed comprises at least one separate gas bypass tube.

* * * * *